United States Patent [19]

Gronenberg et al.

[11] Patent Number: 5,386,810
[45] Date of Patent: Feb. 7, 1995

[54] SYSTEM AND METHOD FOR CONTROLLING A SOLENOID-VALVE-CONTROLLED FUEL-METERING DEVICE, PARTICULARLY FOR A DIESEL GASOLINE ENGINE

[75] Inventors: Roland Gronenberg, Stuttgart; Helmut Laufer, Gerlingen; Werner Fischer, Heimsheim; Dietbert Schoenfelder, Gerlingen; Joachim Berger, Winterbach, all of Germany

[73] Assignee: Robert Bosch GmbH, Stuttgart, Germany

[21] Appl. No.: 61,415

[22] Filed: May 12, 1993

[30] Foreign Application Priority Data

May 12, 1992 [DE] Germany ............... 4215581

[51] Int. Cl.⁶ .................................... F02M 7/00
[52] U.S. Cl. .................................... 123/436
[58] Field of Search ............... 123/436, 478, 480, 687;
364/413.01, 432.18

[56] References Cited

U.S. PATENT DOCUMENTS

| | | | |
|---|---|---|---|
| 4,590,907 | 5/1986 | Tsukamoto et al. | 123/357 |
| 4,642,773 | 2/1987 | Miyaki et al. | 364/431 |
| 5,016,593 | 5/1991 | Takaoka | 123/436 |
| 5,021,960 | 6/1991 | Manaka et al. | 364/431.01 |
| 5,035,220 | 7/1991 | Uchinami et al. | 123/436 |
| 5,060,618 | 10/1991 | Takaoka et al. | 123/436 |
| 5,231,966 | 8/1993 | Yoshida et al. | 123/436 |
| 5,261,366 | 11/1993 | Reguiero | 123/299 |
| 5,261,374 | 11/1993 | Gronenberg et al. | 123/436 |
| 5,263,455 | 11/1993 | Iwai et al. | 123/478 |
| 5,287,282 | 2/1994 | Imai | 364/432.08 |

FOREIGN PATENT DOCUMENTS

| | | |
|---|---|---|
| 0367973 | 9/1989 | European Pat. Off. |
| 0412506 | 8/1990 | European Pat. Off. |
| 4004110 | 8/1991 | Germany |
| 2241354 | 8/1991 | United Kingdom |

*Primary Examiner*—Raymond A. Nelli
*Attorney, Agent, or Firm*—Kenyon & Kenyon

[57] ABSTRACT

In a system and method for controlling a solenoid-valve-controlled fuel-metering device, in particular for a diesel gasoline engine, the duration of delivery is determined based upon the speed value during the preceding metering-in operation.

16 Claims, 3 Drawing Sheets

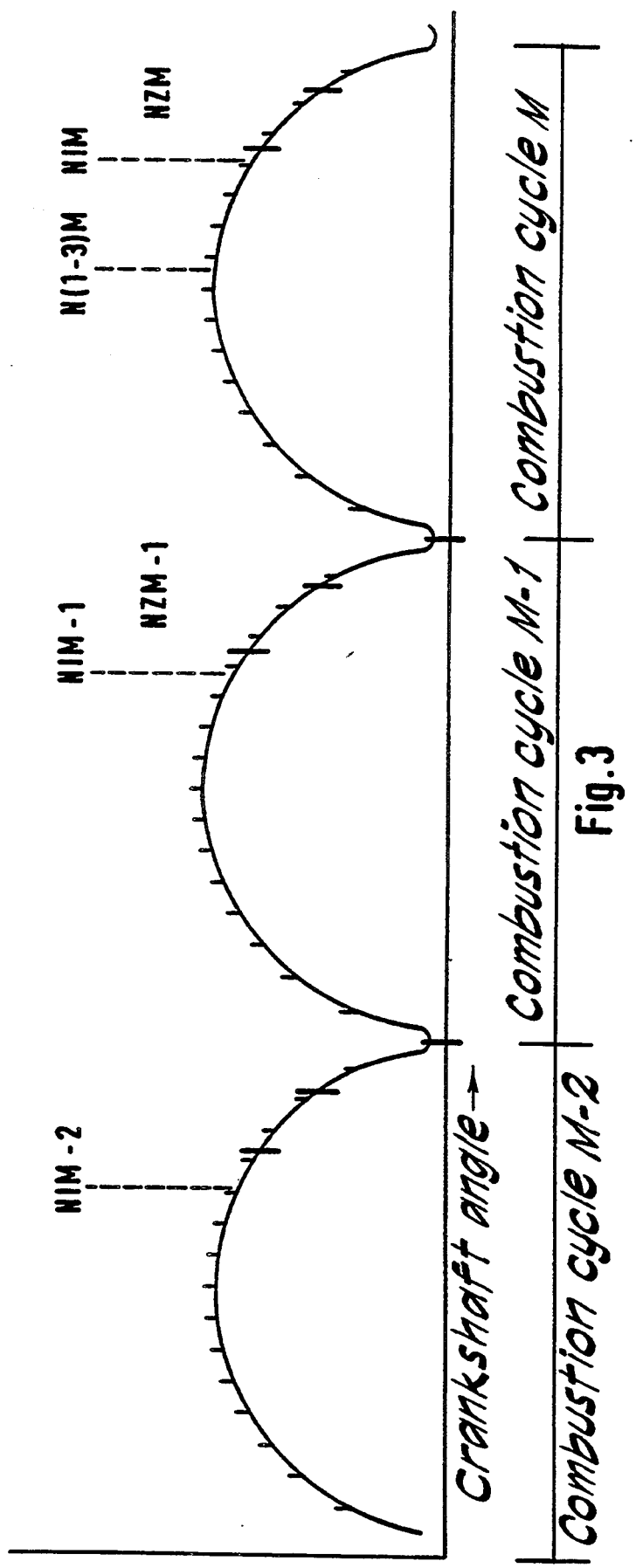

SYSTEM AND METHOD FOR CONTROLLING A SOLENOID-VALVE-CONTROLLED FUEL-METERING DEVICE, PARTICULARLY FOR A DIESEL GASOLINE ENGINE

FIELD OF THE INVENTION

The present invention relates to a system and method for controlling a fuel-metering device, and in particular to a system and method for controlling a solenoid-valve-controlled fuel-metering device.

BACKGROUND INFORMATION

A system for controlling a solenoid-valve-controlled fuel-metering device is described in German Unexamined Patent Application No. 40 04 110. In particular, this reference describes a system for controlling a solenoid-valve-controlled fuel-metering device for a diesel gasoline engine. In this device, control signals are specified for determining a fuel quantity dependent upon rotational speed and load. In such systems, the rotational speed must be detected as precisely as possible.

An object of the present invention is to enable the rotational speed to be detected as precisely as possible in a system for controlling a solenoid-valve-controlled fuel-metering device.

SUMMARY OF THE INVENTION

The present invention provides a system and method for controlling a solenoid-valve-controlled fuel-metering device, in particular for a diesel gasoline engine. A trigger signal to control a fuel-metering operation of the fuel-metering device is generated dependent upon a rotational speed of the engine during the previous fuel-metering operation of the fuel-metering device and upon a load on the engine.

The system and method according to the present invention make it possible to detect the rotational speed of the engine and to calculate the trigger signals in a much more precise manner, based upon the detected rotational speed.

BRIEF DESCRIPTION OF THE DRAWINGS

FIG. 3 shows a graph of the instantaneous rotational speed over three dosing operations.

DETAILED DESCRIPTION

In known systems for controlling a solenoid-valve-controlled fuel-metering device, trigger signals are specified for the solenoid valve at least dependent upon load and rotational speed.

Figure 1:
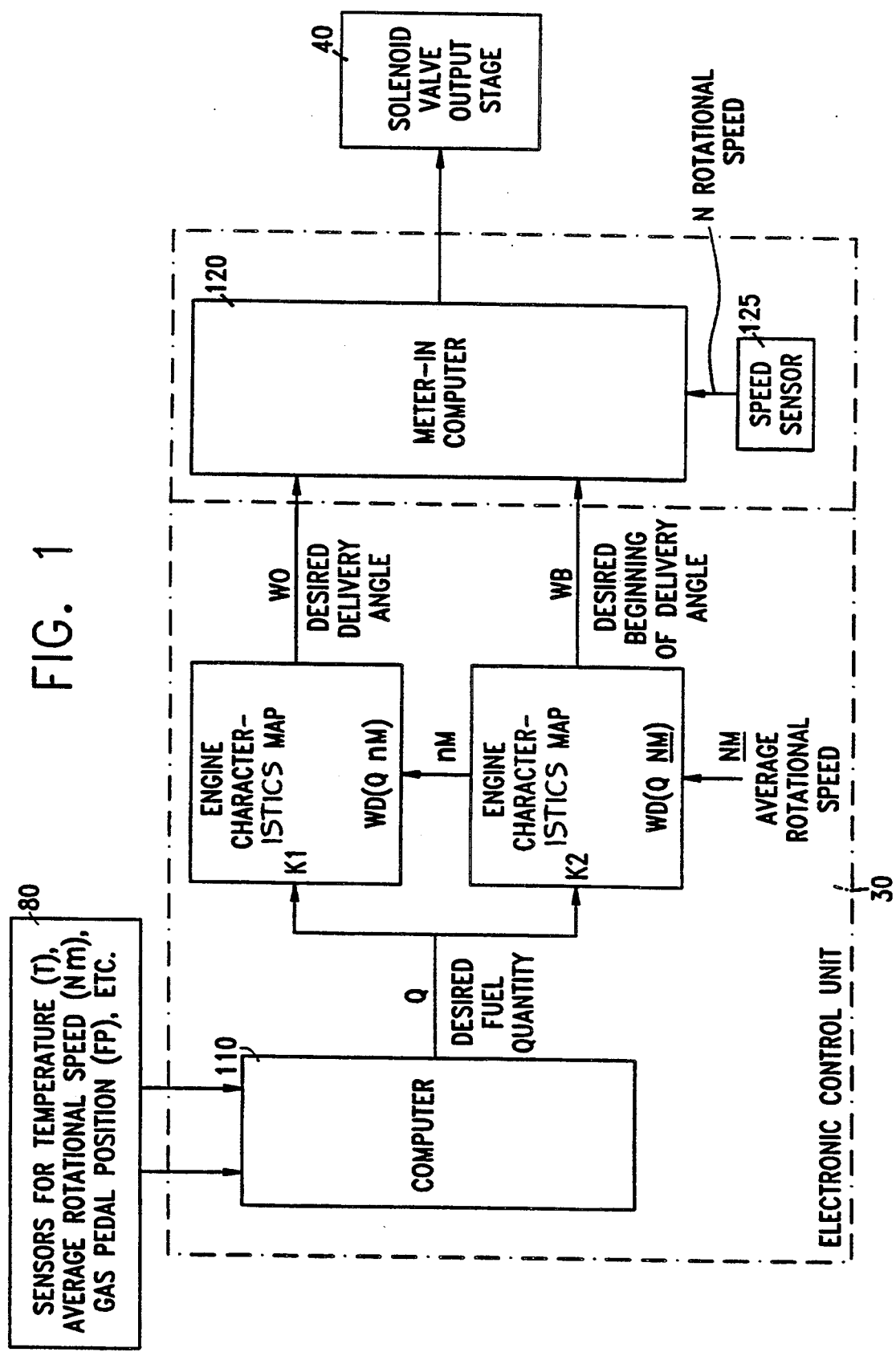
FIG. 1 shows a schematic representation of a system for controlling a fuel-metering device.

Such a system is depicted schematically in FIG. 1. A solenoid-valve output stage 40 receives signals from an electronic control unit 30. The electronic control unit 30 includes essentially a meter-in computer 120, engine characteristics maps K1, K2, and a computer 110. A signal from a speed sensor 125, which acquires the instantaneous rotational speed N of the camshaft, is fed to the meter-in computer 120. Furthermore, signals indicating the desired delivery angle WD and the desired beginning of delivery (angle) WB are fed to the meter-in computer 120. These signals originate from engine characteristics maps K1 and K2, respectively. The average rotational speed NM and the desired fuel quantity Q serve as input variables for the engine characteristics maps K1 and K2. The desired fuel quantity Q originates from a computer 110, which calculates the desired fuel quantity Q dependent upon the various input variables. For this purpose, signals from various sensors 80 are supplied to the computer 110.

Starting from the variables acquired by the sensors 80, such as average rotational speed NM, temperature T, gas-pedal position FP, and additional operating parameters, the computer 110 calculates the desired injection quantity Q. Dependent upon this injection quantity Q and the average rotational speed NM, the delivery angle WD is read out from the engine characteristics map K1. The delivery angle WD directly determines the fuel quantity to be injected. This is the angle that the camshaft passes through while the fuel pump is delivering fuel.

The beginning of delivery WB is read out from the second engine characteristics map K2 dependent upon the injection quantity Q and the average rotational speed NM. This is the angle at which the injection is supposed to begin.

The average rotational speed NM can be derived from various sensors. As a rule, a sensor that detects pulses from a pulse wheel on the crankshaft, or on the camshaft, is used. In conventional systems, the mean of the rotational speed is taken over a greater angular range, or over several camshaft revolutions.

Within the scope of the application, these engine characteristics maps K1, K2 are measured on a testing device. For this purpose, the pump is driven by an electromotor at a constant rotational speed, and the quantity of fuel that is injected is determined thereby.

If the pump is actuated directly by the internal combustion engine, the rotational speed fluctuates considerably. This rotational speed profile is shown in FIG. 3. The metering-in takes place shortly before the minimum of the rotational speed profile. The rotational speed, which results from the evaluation of known speed sensors, is usually greater than the rotational speed during the metering-in operation. Since the engine characteristics map was applied with a constant rotational speed, the rotational speed which is used to read out the characteristic values should correspond to the rotational speed used in the application. If this is not the case, the result is considerable deviations from the desired quantity to be injected.

The meter-in computer 120 converts the angular signals WD, WB into time variables, with the aid of the instantaneous rotational speed N. These time variables determine at which instant the solenoid valve is loaded with voltage. Thus, the meter-in computer stipulates the instants when the voltage applied to the solenoid valve changes. These values are fed to the output stage 40, which converts them into a trigger signal for the solenoid valve.

To compensate for the above-described disadvantages of inaccurate fuel dosing, the present invention proposes using the current rotational-speed value during the metering-in interval to calculate the engine characteristics map. Since this signal does not exist yet at the time the engine characteristics map is calculated, the corresponding value of the previous metering-in operation is used.

To obtain good dynamic performance, accelerations and decelerations must be taken into consideration. To achieve this, a speed gradient DN is determined, which is used to correct the speed value NZM-1 of the preceding metering-in. The speed gradient DN is a measure for changing the speed during one combustion cycle.

Figure 2:
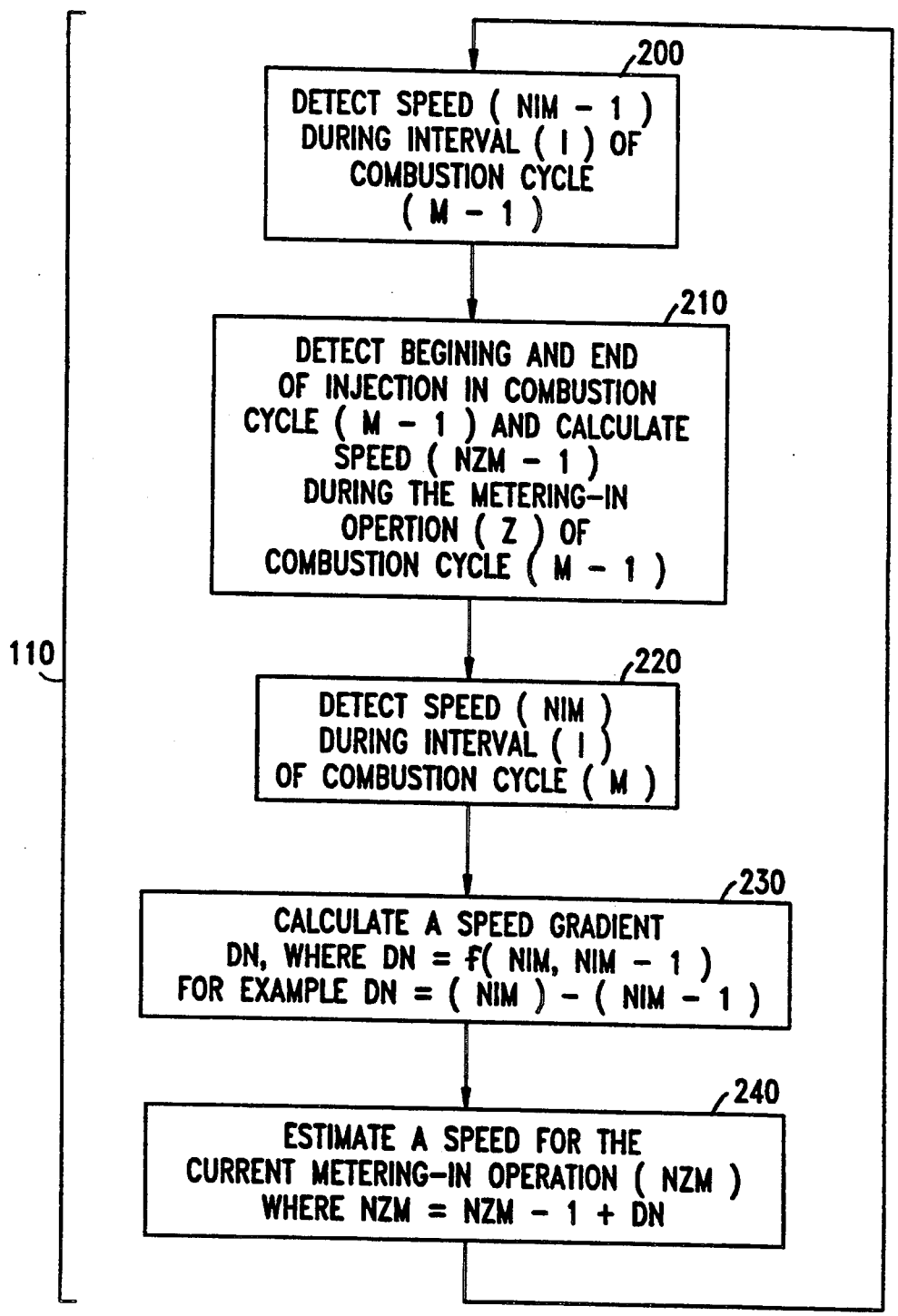
FIG. 2 shows a flow chart for clarifying the method of operation of the system according to the present invention.

Referring to FIG. 2, it will now be described how the rotational speed NM required to calculate the engine characteristics map is determined. In a first step 200, the speed value NIM-1 of a specific increment is detected at one defined position of the crankshaft, or of the camshaft. The speed value NZM-1 is subsequently detected during the metering-in in step 210. For this purpose, a signal indicating the instant of the exact beginning of injection and the exact end of injection is detected. To this end, sensor signals can be detected, which indicate the position of the solenoid valve or of an injection valve. It is also possible, however, that on the basis of the current flowing through the solenoid valve, or of the voltage being applied to the solenoid valve, instants are recognized when the solenoid valve opens or closes. These signals are a measure of either the actual beginning of delivery, the beginning of injection for the end of delivery, or the end of injection. By means of an interpolation or an extrapolation, the particular angular position is calculated very precisely. Based upon the angular position at the beginning and end of the injection and upon the injection duration, the speed value during the metering-in is then obtained. This speed value corresponds to a speed that has been averaged over the metering-in interval.

In step 220, the speed value NIM is then detected at the same defined position with the crankshaft, as is the case with the preceding metering-in. In step 230, the speed gradient DN is calculated based upon the speed value NIM-1 detected before the metering-in M-1 and upon the speed value NIM detected in the metering-in cycle M. In the simplest case, merely the difference between the two speed values is determined. Thus, the speed gradient DN is obtained starting from two speed values NIM-1 and NIM over two increments. These two increments have the same phase position in two consecutive metering-in operations. The last of these two metering-in operations is the one whose trigger signals are calculated. The increments having a defined phase position exhibit a spacing of 90° in the case of a four-cylinder internal combustion engine and a spacing of 60° in the case of a six-cylinder internal combustion engine. Generally, these increments are spaced apart by 360°/z, where z represents the number of cylinders in an internal combustion engine.

In step 240, the speed value NZM, which is needed to calculate the engine characteristics map, is calculated based upon the speed value NZM-1 during the metering-in for the preceding metering-in cycle M-1, as well as for the speed gradient DN.

In FIG. 3, the speed is plotted for three combustion cycles. An incremental gear is installed on the crankshaft and/or on the camshaft. This incremental gear has several markings. The markings are preferably arranged at spacings of approximately 3°. A sensor detects these markings and, at specified intervals, delivers pulses, which are marked with small perpendicular lines in FIG. 3. These intervals are typically referred to as increments.

To calculate the rotational speed NM, the rotational speeds are evaluated over individual increments. The increments of one combustion cycle are denoted by the index I, and the individual combustion cycles are denoted by the index M. The index I designates that increment for which the rotational speed NIM is obtained in each case with a defined phase position. The index M designates the combustion cycle for which the trigger signals are to be calculated for the solenoid valve. Therefore, to calculate the speed gradients, the rotational speeds $N_IM-1$ and $N_IM$ are evaluated.

The metering-in intervals are indicated by longer perpendicular lines. It should be noted that the beginning and the end of the particular metering-in do not necessarily have to correspond with the increments. To obtain the speed value over one metering-in operation NZM or NZM-1, the interval, as just described, between the beginning and end of the metering-in is evaluated.

To obtain a further improvement in the speed signal, one refinement of the invention provides for an average to be taken to calculate the speed gradients. For this purpose, the speed values NIM are averaged over several increments, rather than merely detected over a single increment. This can be implemented, for example, by detecting speed values over several increments, as in step 220. This means that the speed values NIM, N(I-1)M, N(I-2)M, . . . are detected and added up, and are used to generate the mean value. Preferably, the speed values are calculated separately for each cylinder.

What is claimed is:

1. A system for controlling a solenoid-valve-controlled fuel-metering device for an engine, comprising:
a control unit for generating a trigger signal to control a fuel-metering operation of the fuel-metering device, the control unit generating the trigger signal as a function of a load on the engine and a predicted rotational speed of the engine during a current fuel metering operation, the predicted rotational speed being based upon at least an actual rotational speed of the engine during a preceding fuel-metering operation.

2. The system according to claim 1, wherein the engine is a diesel gasoline engine.

3. The system according to claim 1, wherein the control unit determines a delivery angle based upon the predicted rotational speed and the load, the delivery angle establishing a duration of fuel injection.

4. The system according to claim 1, wherein a beginning time and an end time of the trigger signal are based upon the predicted rotational speed.

5. The system according to claim 1, wherein a beginning and end of fuel injection are based upon the predicted rotational speed.

6. The system according to claim 1, wherein the actual rotational speed is based upon an interpolated angle.

7. The system according to claim 1, wherein the control unit corrects the actual rotational speed as a function of a speed gradient to obtain the predicted rotational speed.

8. The system according to claim 7, wherein the speed gradient is based upon first and second rotational speeds ever two respective increments, the two increments having an equal phase position in two consecutive fuel-metering operations.

9. The system according to claim 8, wherein the two increments are separated by 360°/z, where z represents a number of cylinders of the engine, the engine being an internal combustion engine.

10. The system according to claim 8, wherein the control unit averages the rotational speed over a plurality of intervals to obtain the speed gradient.

11. The system according to claim 1, wherein the trigger signal is dependent upon rotational speeds of respective cylinders of the engine.

12. A method of controlling a solenoid-valve-controlled fuel-metering device for an engine, comprising the steps of:

determining a load on the engine;

determining a rotational speed of the engine during a fuel-metering operation of the fuel-metering device; and generating a trigger signal to control a subsequent fuel-metering operation of the fuel-metering device as a function of the load and a predicted rotational speed for the subsequent fuel-metering operation, the predicted rotational speed being based upon at least the determined rotational speed.

13. The method according to claim 12, wherein the engine is a diesel gasoline engine.

14. The method according to claim 12, further comprising the step of determining a fuel delivery angle based upon the load and the predicted rotational speed.

15. The method according to claim 12, further comprising the step of correcting the rotational speed as a function of a speed gradient to obtain the predicted rotational speed.

16. The method according to claim 15, further comprising the step of averaging the rotational speed over a plurality of intervals to obtain the gradient.

* * * * *